July 13, 1965
H. B. McKEAN
3,194,063
NON-DESTRUCTIVE STRENGTH TEST OF STRUCTURAL LUMBER
Filed March 1, 1962
2 Sheets-Sheet 1
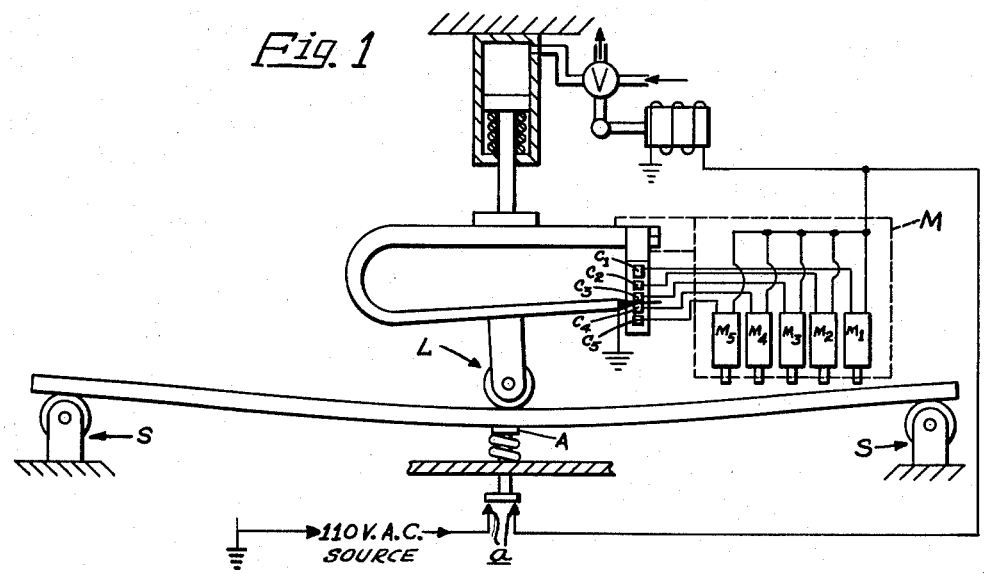
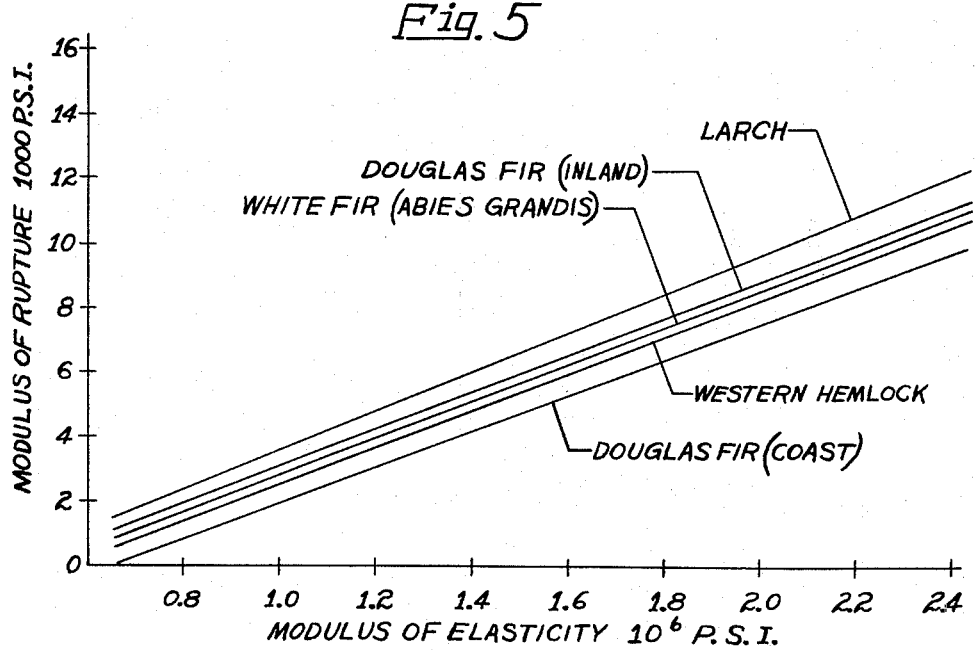
INVENTOR.
HERBERT B. McKEAN
BY
ATTYS.

July 13, 1965  H. B. McKEAN  3,194,063
NON-DESTRUCTIVE STRENGTH TEST OF STRUCTURAL LUMBER
Filed March 1, 1962  2 Sheets-Sheet 2
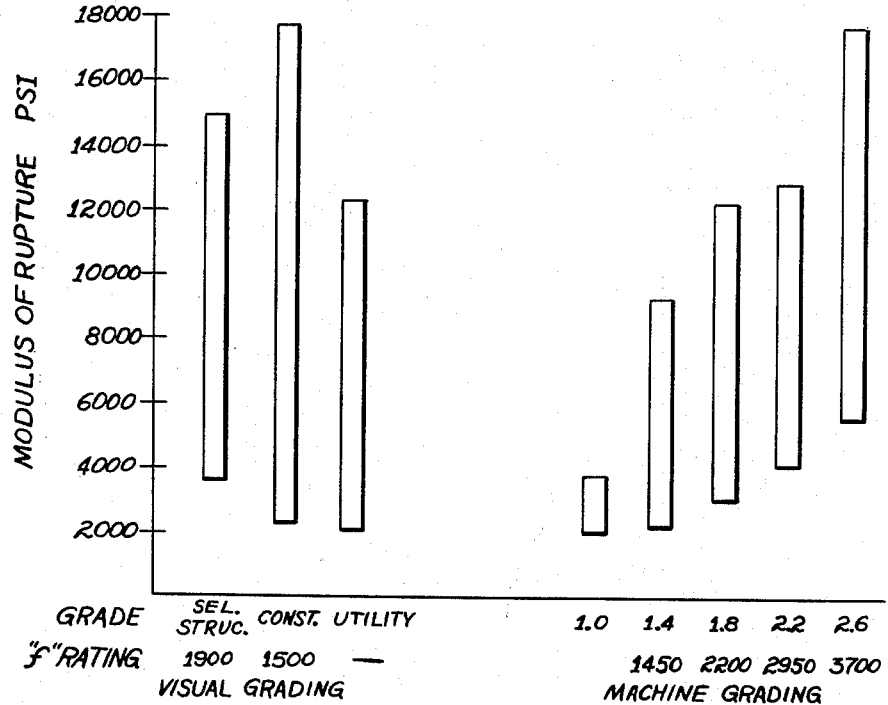
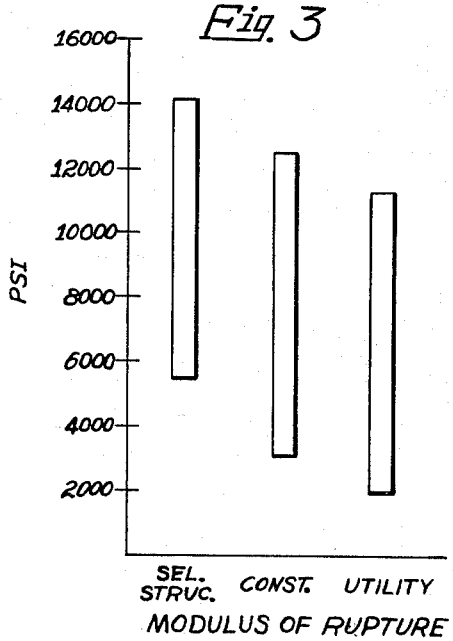
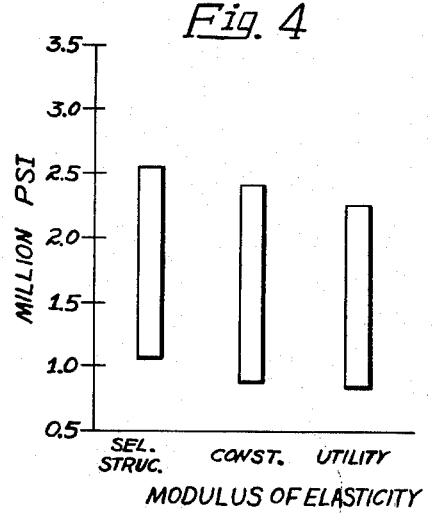
INVENTOR.
HERBERT B. McKEAN
BY Wells & St. John
ATTYS.

3,194,063
NON-DESTRUCTIVE STRENGTH TEST OF
STRUCTURAL LUMBER
Herbert B. McKean, Lewiston, Idaho, assignor to Potlatch Forests, Inc., Lewiston, Idaho, a corporation of Delaware
Filed Mar. 1, 1962, Ser. No. 176,646
8 Claims. (Cl. 73—100)

Heretofore the grading of lumber for structural use has been a matter of setting up various standards to govern the weight to be given to various visible characteristics of the lumber, such as knots, checks, grain, etc. in determining the grade. The grading is then done by individuals more or less skilled in the application of these standards. These graders examine the lumber visually and establish the grade without benefit of any actual tests of the pieces being graded.

Lumber is from a natural growth and its load bearing strength varies greatly. Heretofore it has been necessary to break a piece to determine its load bearing strength. I have found, however, that it is possible to obtain a reliable indication of the breaking strength of lumber pieces without actually breaking (and thus destroying) them. My conception is that the lumber pieces may indicate their breaking strength by another measurable characteristic, stiffness or resistance of the piece to bending, if that stiffness, as indicated by the modulus of elasticity for a particular piece or board, is determined under a quick loading that is sufficiently high to bring to light hidden weaknesses and that is low enough to avoid exceeding the fiber stress at proportional limit for that species of wood. For the purposes of this application the term "proportional limit" may be defined as the greatest stress which a material is capable of sustaining without any deviation from proportionality of stress to strain. For the basis of this definition see—"The Mechanical Properties of Wood," by Frederick F. Wangaard, published by John Wiley & Sons, Inc., of New York, N.Y. in 1950, and the "Wood Hanbook," Agriculture Handbook No. 72 published by the U.S. Department of Agriculture, Washington, D.C. in 1955. This latter publication contains on pp. 70-77, average values for fiber stress at proportional limit for many species of commercially used woods. In the following discussion whenever referred to, the fiber stress at proportional limit means such average value predetermined for the species under test, unless it is specifically pointed out that the proportional limit is for the piece being tested.

It is therefore, the purpose of my invention to provide a new method of indicating the safe load to which lumber pieces may be subjected which comprises bending the pieces by subjecting each piece throughout its length to a brief loading such that the fiber stress is at least high enough to bring out hidden weakness and such stress is below that at proportional limit and applying to such pieces an indication of their safe load bearing strength as determined by such bending.

In order that the nature of my invention and the object thereof may be more fully understood reference is made to the accompanying drawings and the following description.

In the drawings:

FIGURE 1 is a diagrammatic view of the apparatus necessary to effect the bending of the lumber and indication of the load bearing strength thereof;

FIGURE 2 illustrates a comparison of the actual ranges of moduli of rupture variation in visually graded pieces of structural lumber with the ranges of moduli of rupture in the same pieces graded by my method;

FIGURES 3 and 4 illustrate the ranges of moduli of rupture and moduli of elasticity found in three common grades of inland Douglas fir; and FIGURE 5 is an illustration of the relation of modulus of elasticity to modulus of rupture for several species determined through testing more than 1200 pieces of commercial size material by my method.

It is well known that the species of lumber used for structural purposes vary considerably in their breaking strength. Also there are indications of considerable variation in breaking strength within species, depending upon rate of growth, presence of defects, etc. I have found, however, that by use of my method it is possible to predict the safe load bearing strength of lumber pieces without breaking them and to do it fast enough to make the method usable wherever lumber is produced from logs.

It has been the practice in measuring the strength properties of structural lumber to make actual breaking strength tests on representative sample beams by bending them until they break, and, to determine thereby a representative modulus of rupture for that species of wood. From the modulus of rupture engineers derive a basic stress value for each species of wood and then by further applying formulae to take into consideration the growth characteristics of the wood, such as knots, an allowable stress value is derived. Since wood varies widely in its strength properties, it is necessary to apply relatively high safety factors so that the weakest piece being used in a structure will be able to support the design load. As a consequence, pieces of greater strength, but not detectable by any presently used grading method, are made larger than necessary in order to insure that the weaker pieces, which look like the strong pieces, will be able to carry the imposed load.

In developing these safe stresses in bending, it is recognized that, as the sizes of knots and other defects increase, the strength or safe stress of the piece decreases. This safe stress, commonly symbolized by "$f$" enables engineers to determine safe loads that a timber can support but without regard to the amount of deflection that would occur in the piece under the load that is to be applied.

Over the years in the development of design procedure for lumber it has been commonly accepted that growth characteristics, such as knots, do not influence the stiffness or modulus of elasticity of a structural member. Modulus of elasticity is given as a fixed figure for the species.

For example, the "Wood Handbook" mentioned hereinbefore states on page 94—"The stiffness of the beams is also affected but little by knots." Also the National Lumber Manufacturer's Association of Washington, D.C., in its "National Design Specification," shows design values for a number of grades of many species of lumber. In general, all grades of stress-graded lumber in a species are shown in these values as having the same modulus of elasticity, or E value, but, as the size of defect increases, the allowable stress or "$f$" decreases. According to "Minimum Property Standards" published by the Federal Housing Administration under the designation F.H.A. 300 dated November 1, 1958, (page 250), in Douglas fir, for example, the allowable design stress varies all the way from 2150 p.s.i. down to 500 p.s.i. in stress graded lumber, yet the E value is given as 1,760,000 for all grades.

I have discovered that there are significant variations in the modulus of elasticity (E value) of pieces of lumber of the same species and that these variations do give an indication of the modulus of rupture and thereby the safe stress "$f$" that can be allotted to the pieces. I have established, through bending the pieces under controlled conditions and establishing the true E value, (ratio of stress to strain or deformation), and subsequent breaking of the pieces, that as stiffness increases, as indicated by an increase in the modulus of elasticity so also does the modulus of rupture.

Some 600 pieces of structural lumber in two grades were tested to provide the data illustrated in the following Table I. In these tests the E value was determined and the pieces were finally broken in order to determine the modulus of rupture with accuracy.

Table I

| "E" p.s.i.: | Average Modulus of rupture, p.s.i. |
|---|---|
| Less than 1,400,000 | 4,500 |
| 1,400,000–1,600,000 | 5,700 |
| 1,600,000–1,800,000 | 7,100 |
| Over 1,800,000 | 8,800 |

The pieces tested were of various cross sectional dimensions. Some were nominal 2 inch by 4 inch, others 2 inch by 6 inch, 2 inch by 8 inch and 2 inch by 10 inch.

I have found that for accurate determination it is most desirable to apply the load in a direction perpendicular to the widest face of the piece under test. Also for many practical reasons, it is desirable to deflect all pieces a certain amount between supports and take readings of the applied force. If a predetermined load is applied and the deflection readings taken, we have a problem of speedily applying a uniform load as the load moves over variable distances. To be useful the load application and release must be quite rapid. While my invention is not limited to the following procedure, I have found that procedure to be quite effective in obtaining reliable results.

As illustrated in FIGURE 1, the piece to be tested is subjected to a variable load L intermediate two supports S—S at the ends of the span. The piece is deflected until the maximum deflection desired is reached at which time the board will be brought in contact with an actuating element A, which results in the closing of contacts $a$ that cause the indicated load to be registered and used to set a marking device M or other means for indicating that the piece bent has a safe working stress within a certain range. In FIGURE 1 the load is measured in steps. As the load increases contacts $c_1$, $c_2$, $c_3$, $c_4$, $c_5$ are successively closed to select a marker $M_1$, $M_2$, $M_3$, $M_4$, or $M_5$ and, upon the deflection bringing the mid point of the piece to its lower limit, where it engages the actuating element A, the loading is stopped and one of the markers $M_1$, etc. then marks the piece. Thus all pieces are bent the same amount and the force necessary to bend the piece that amount is measured and indicated in steps by the markers. I find that it is advisable in order to obtain reliable load readings, to perform the bending in such a manner that the piece is subjected to a load that produces about 15% or more of the fiber stress at proportional limit for the species. This is enough to reduce the effect of errors in measuring the load and the deflection. At lower loading there is difficulty in obtaining accurate measurements because of these possible errors in measuring. Higher loads and greater deformation do increase the accuracy, but it is not the function of the test to apply a load that itself would be the allowable load the piece would be subjected to when used as a structural member.

In considering proportional limit we must point out that the tests which have formed the basis for the published data found in the "Wood Handbook," hereinbefore referred to, were upon standard small clear specimens. The proportional limit according to this data appears to be in the range of 60%–70% of the modulus of rupture. On the other hand, data which I now have available indicates that the proportional limit in normal commercial size pieces of lumber is only about 50%–60% of the modulus of rupture of such commercial size pieces. These relationships are based on comparing values in the "Wood Handbook" for coast Douglas fir with tests on 333 commercial sized pieces of Douglas fir.

Our tests have shown that a good range for this non-destructive test is to use a loading that will produce a fiber stress that is between 25% and 50% of the fiber stress at proportional limit of the piece being tested. However, to arrive at the fiber stress at proportional limit for each piece is obviously out of the question in a commercially operable testing. For the sake of accuracy the loading should be high enough so that the error due to reading inaccuracies has little effect. This is easily accomplished if the stress induced is from 30% to 40% of the proportional limit of the species being tested. To avoid damage to the weaker pieces by exceeding the proportional limit, it is advisable to keep the stress below 60% of the predetermined proportional limit for the species.

It is always advisable to perform the bending in such a manner that the fiber stress at proportional limit is not exceeded. I have found in this regard that performing the bending and release of the piece at high speed is advantageous. The fiber stress at proportional limit is an average for the species. The proportional limit is lower if wood is subjected to the load over a longer period of time. Customarily the proportional limit tables are arrived at by loading the pieces 5 minutes to the proportional limit. For my tests the load is applied for a second or less, the duration of load application being insufficient to effect residual deformation of the tested boards after removal of the applied load. I prefer to carry out this high speed loading at a level below 60% of the predetermined proportional limit for the species under test.

Within the ranges of loading set forth above I have discovered that contrary to published information ("Wood Handbook" pp. 94 and 95, and the "National Design Specification" of the National Lumber Manufacturer's Association) for example, there is a sufficient correlation between the modulus of elasticity and the modulus of rupture of structural lumber to enable me to determine the safe working stress for structural lumber. Furthermore, my method in the one operation also accurately determine the modulus of elasticity for each piece of lumber. This is of importance to the lumber user for there are limits to the amounts that structural pieces may bend in designing a structure. For example, it is common to limit ceiling joists to a deflection of no more than an amount equal to 1/360th of the length of the piece, under full load. My discovery provides, for the first time, a way of determining the strength for each individual piece of structural lumber without breaking it.

As a practical matter the pieces may be subjected to the bending by either uniform deformation with varying loads (my preferred method), or uniform load with varying deflections may be employed. The entire length of the piece may be subjected to one intermediate loading or segmentally loaded so long as the whole piece is actually tested. The cross-sectional dimensions of the piece must be accurately known and the length of the span over which the test is made must be accurately known.

The illustration in FIGURE 2 shows a comparison of the effects of mechanical grading by my method and visual grading of the same pieces. Some 225 pieces of Pacific Coast Douglas fir of like dimensions were graded visually and marked in accordance with standard practice and were then graded by my method and marked, and finally were broken to determine the modulus of rupture of each piece. The pieces as visually graded were marked to indicate the commonly employed designations for structural lumber; that is: "select structural" which would be considered in the trade to have an "f" rating or allowable stress of 1900 p.s.i.; "construction" which would be considered to have an "f" rating of 1500 p.s.i.; "utility" which would be "f" graded normally at 500 to 700 p.s.i., a very poor rating insofar as structural use is concerned. It was found, as indicated in FIGURE 2, that the actual modulus of rupture in the utility grade ranged from about 2000 p.s.i. to about 12,000 p.s.i. Obviously this grade included many pieces of much greater strength than the visual grading indicated. It was found that the "construction" grade included pieces not much stronger than the weakest pieces found in the utility grade. This grade, however, included the strongest pieces in the group tested. The modulus of rupture varied between about 2400 p.s.i and 17,500 p.s.i. in this group. The "select structural" grade was more uniform as is evident in FIGURE 2. The pieces visually placed in this grade varied between about 3500 p.s.i. and 15,000 p.s.i. in modulus of rupture.

In grading by my method the pieces arbitrarily were separated into five groups according to the load required to bend the pieces a predetermined amount without exceeding the established fiber stress at proportional limit for the species as defined hereinbefore. The moduli of rupture with the comparable "f" grades determined by my method are tabulated at the right hand side of FIGURE 2. A small range of modulus of rupture was found in the group having the designation 1.0 arbitrarily selected to include pieces showing a modulus of elasticity of 1.35 million p.s.i. and lower when tested according to my method. In the second group graded by my method and having the designation 1.4, we placed those pieces showing a modulus of elasticity between 1.35 million p.s.i. and 1.75 million p.s.i. We found that the modulus of rupture in this group ranged from about 2200 p.s.i. to 8750 p.s.i. Those pieces showing a modulus of elasticity between 1.75 million p.s.i. and 2.15 million p.s.i. and labelled 1.8 were placed in the third group. Upon breaking, these pieces showed a range in modulus of rupture from 3000 p.s.i. to 12,000 p.s.i. In the next group labelled 2.2, we placed those pieces showing a modulus of elasticity by my method above 2.15 million p.s.i. up to 2.5 million p.s.i. This group showed a range in modulus of rupture from 4200 p.s.i. to 12,500 p.s.i. Those pieces showing a modulus of elasticity over 2.5 million p.s.i, when tested by my method, were placed in the group marked 2.6 in FIGURE 2. This was the largest group and when broken, the range in modulus of rupture was found to be from 6,000 p.s.i. to 18,000 p.s.i.

This comparison of my method of grading with the visual method shows that all of the pieces except the few within group 1.0 had an allowable working stress or "f" grade (when calculated with the commonly used reduction factor of 1/3 of the minimum modulus of rupture in the group) nearly equal to or above that of the "construction" grade of the visual grading. Furthermore, the large 2.6 group had an "f" rating nearly twice that of the "select structural" grade of the visual grading. With the grading by my method most of the "lumber" put in the "utility" grade by visual grading was found to be strong enough for inclusion in the construction grade. Also the 2.6 group showed a strength capable of withstanding nearly twice the allowable working stress attributed to the select structural grade under visual grading.

In FIGURES 3 and 4, I have shown a comparison of the range of modulus of rupture with the range of modulus of elasticity as actually determined by testing seventy-five pieces of lumber in each grade listed. In this case the species under test was inland Douglas fir. Similar data collected on the other principal structural species, namley, white fir (Abies grandis), western hemlock, western larch and coast Douglas fir have shown that a similar variation of both strength properties exists in each species.

Three hundred pieces of white fir were tested to determine modulus of elasticity and modulus of rupture. These pieces were of three sizes, 2 x 4, 2 x 6, and 2 x 8, fifty pieces of each size in each grade.

Similar tests were conducted on the other species named above with similar results. It was found, however, that the relation of modulus of elasticity to modulus of rupture varied with the species. For example, it was found that the modulus of rupture at a given modulus of elasticity was higher for larch than it was for inland Douglas fir, coast Douglas fir, white fir or hemlock. Using the data obtained from the testing of some 1200 pieces, regression equations were determined by the method of least squares assuming the data were best fitted by a straight line. The resulting equations and lines are shown in FIGURE 5. The various lines marked by species do not illustrate relative strength properties of the several species. They merely show that when we are bending pieces according to my method, the species does effect the determination of strength. If the load required to bend the piece the predetermined amount indicated a modulus of elasticity for larch and hemlock of 1.8 million p.s.i., then this would indicate a modulus of rupture for the hemlock of about 7200 p.s.i. and for larch about 8400 p.s.i.

According to my method the load reading is obtained in a very simple manner as described hereinbefore. This load reading is a true measure of the E value of the piece. Also by applying the species factor indicated in FIGURE 5, the M value, within limits, is obtained and by applying the commonly used one third reduction factor to the lowermost M value for the M range indicated by the load reading, I obtain a working stress or "f" value. These values can be set up in a table based on the E values measured so that the only other thing necessary is to calibrate the load measurement in terms of E-range. Then, when a piece is bent to the predetermined deflection, the reading obtained directly gives the stiffness of the piece and, through the table, the allowable working stress. The following table for four species shows how the E readings are converted into suggested allowable working stresses for four species. For speed and convenience the E readings are indicated on the load indicator in steps. The pieces are sorted into E-classes according to the indicated steps. The suggested allowable working stress for any particular E-class is shown by Table II below.

*Table II*

| E-class or load reading | E-range millions, p.s.i. | Allowable working stress, p.s.i. | | | |
|---|---|---|---|---|---|
| | | Inland Douglas fir | Larch | White fir | Western hemlock |
| 1.0 | 0.8–1.2 | 970 | 1,060 | 915 | 815 |
| 1.4 | 1.2–1.6 | 1,630 | 1,715 | 1,515 | 1,460 |
| 1.8 | 1.6–2.0 | 2,260 | 2,375 | 2,145 | 2,115 |
| 2.2 | 2.0–2.4 | 2,900 | 3,020 | 2,775 | 2,760 |
| 2.6 | Above 2.4 | 3,550 | 3,660 | 3,400 | 3,400 |

I find that the non-restructive testing is done most advantageously with fixed deflection and variable load, the reading being then a matter of reading the load at the time of reaching the deflection and discontinuing the loading at this point. Thus, if a piece bends so readily that it reaches the predetermined deflection under a load of less than the minimum load (15% of proportional limit for the species) then the piece can be passed on through the machine without injuring it and graded as non-structural. It is possible to use a fixed load of sufficient magnitude and a variable deflection to obtain reliable correlation between modulus of rupture and modulus of elasticity, but it is then easy to cause damage to the weaker pieces by bending them enough to cause permanent damage to them.

In the foregoing disclosure I have described my invention and the best manner presently known to me for practicing the invention. By employment of my invention to grade structural lumber, a substantial saving is accomplished in the amount of lumber needed for the load carrying elements of a structure. The designer of the structure has reliable information obtained by actual test of the allowable working stress and the stiffness of the structural pieces within a grade established by my method. For the first time this naturally grown building material can be segregated into grades of modulus of elasticity based upon individual tests of each piece which also give a reliable indication of the strength of each piece.

It is believed that the nature of my invention will be clear from the foregoing description.

I claim:

1. The method of grading, by a non-destructive test, a series of boards of a particular wood species produced as structural lumber and having a rectangular cross section comprising:

bending each board of the series, one after another between supports, without impact, in a direction perpendicular to a flat face of the board by physically applying to the board a force of magnitude such as to produce within the board a fiber stress less than the maximum fiber stress which the material of the board is capable of sustaining without deviation from proportionability of stress to strain;

deriving the stress to which the board is subjected by relating the applied force to the board dimensions;

measuring the deflection sustained by the board under such stress and deriving the strain sustained by the board by relating the deflection to the distance between supports;

releasing the applied force, the time of application of said force being insufficient to effect residual deformation of the board after removal of the applied force;

and mechanically grading the individual boards of the series so bent according to the modulus of elasticity of each individual board as indicated by its measured stress and strain and further according to a predetermined relationship for its species between ultimate strength and said modulus of elasticity.

2. The method as defined in claim 1 wherein the applied force is such as to produce in the board a fiber stress of about 30% to 40% of the fiber stress at proportional limit for the material of the board.

3. The method as defined in claim 1 wherein the applied force is applied to the board in the direction of least dimension of the board.

4. The method of grading, by a non-destructive test, a series of boards of a particular wood species produced as structural lumber and having a rectangular cross section comprising:

bending each board of the series, one after another, transversely in a direction perpendicular to a flat face thereon, the deflection of each board carried out between two supports by application to the boards of an opposed force having a magnitude such as to produce within the bent board a fiber stress below the fiber stress at proportional limit, the applied force being directed to the board at a mid point between the supports;

mechanically limiting the maximum deflection of each bent board to a predetermined amount;

moving a variable recording device in response to the amount of force applied to bend each board the predetermined amount;

releasing the applied force, the time of applicaiton of said force being insufficient to effect residual deformation of the boards following removal of the applied force;

and mechanically grading the individual boards of the series so bent in direct proportion to the movement of the recording device whereby to provide a direct indication from which the modulus of elasticity and the strength of each board of the series can be determined.

5. The method as defined in claim 4 wherein the amount of bending of each board is such that the board is subjected to a fiber stress above 15% of the fiber stress at proportional limit.

6. The method as defined in claim 4 wherein the force applied to each board is applied in the direction of least dimension of the boards.

7. The method of grading by a non-destructive test, a series of boards of a particular wood species produced as structural lumber and having a rectangular cross section comprising:

bending each board of the series, one after enother, transversely in a direction perpendicular to a flat face thereon, the deflection of each board being carried out between two supports by application to the boads of an opposed force having a magnitude such as to produce within the bent board a fiber stress below the fiber stress at proportional limit, the applied force being directed to the board at a mid point between the supports;

mechanically limiting the maximum deflection of each board to an amount that subjects the board to a fiber stress between 15 to 60% of the fiber stress of the wood;

moving a variable recording device in response to the amount of force applied to bend each board said amount;

releasing the applied force, the time of application of said force being sufficient to effect residual deformation of the boards following removal of the applied force;

and grading the individual boards of the series by operating a lumber stamping device in direct response to variations in applied force detected by the recording device, whereby to provide a direct indication from which the modulus of elasticity and the strength of each board of the series can be determined.

8. The method as defined in claim 7 wherein the force applied to the boards is applied in the direction of least dimension of the boards.

References Cited by the Examiner

UNITED STATES PATENTS

| 2,032,989 | 3/36 | Kenney et al. | 73—146 |
| 2,164,993 | 7/39 | Lewis | 73—89 |
| 2,283,730 | 5/42 | Gardner | 73—100 |
| 2,555,633 | 6/51 | Comins | 73—89 |
| 2,647,456 | 8/53 | Aller et al. | 73—37.5 X |
| 2,649,708 | 8/53 | Maccaferri | 73—100 |
| 3,143,878 | 8/64 | Hoyle et al. | 73—100 |

OTHER REFERENCES

Wangaard: "The Mechanical Properties of Wood," John Wiley & Sons, 1960, pp. 68, 293–298.

ASTM Standards 1958, part 6, page 904.

Wood Handbook, Agriculture Handbook No. 72, U.S. Department of Agriculture, 1955, page 68.

RICHARD C. QUEISSER, *Primary Examiner.*

DAVID SCHONBERG, *Examiner.*